United States Patent [19]

Dennis

[11] 3,803,845
[45] Apr. 16, 1974

[54] THERMAL ENGINE

[76] Inventor: Clifford E. Dennis, 14 Hamburg Tnpk., Hamburg, N.J. 07419

[22] Filed: June 8, 1973

[21] Appl. No.: 368,342

[52] U.S. Cl............... 60/527, 74/111, 310/23
[51] Int. Cl............................................ F03g 7/06
[58] Field of Search........ 60/516, 527, 528; 74/111; 310/4, 22, 23; 290/1 R

[56] References Cited
UNITED STATES PATENTS

| | | | |
|---|---|---|---|
| 947,594 | 1/1910 | Moody | 74/111 |
| 2,338,305 | 1/1944 | Simmon | 14/111 UX |
| 2,729,756 | 1/1956 | Euler et al. | 60/527 X |
| 3,142,149 | 7/1964 | Hays | 60/528 |
| 3,699,769 | 10/1972 | Bondurant | 60/527 |

FOREIGN PATENTS OR APPLICATIONS

| 25,485 | 3/1906 | Australia | 60/527 |
|---|---|---|---|

Primary Examiner—Edgar W. Geoghegan
Assistant Examiner—H. Burks, Sr.
Attorney, Agent, or Firm—Popper, Bain, Bobis, Gilfillan & Rhodes

[57] ABSTRACT

A thermal engine having a pair of levers defining the sides of a triangle, the levers being connected together at their top-ends to define the apex of the triangle, and the levers attached at the other ends to a conduit made of material having a high coefficient of thermal expansion and contraction, which conduit defines the base of the triangle. A pair of opposed pawls attached to the connected ends of the levers, and engaged with a ratchet wheel for rotation in response to the expansion and contraction of the conduit.

5 Claims, 1 Drawing Figure

PATENTED APR 16 1974　　　　　　　　　　　　　　3,803,845
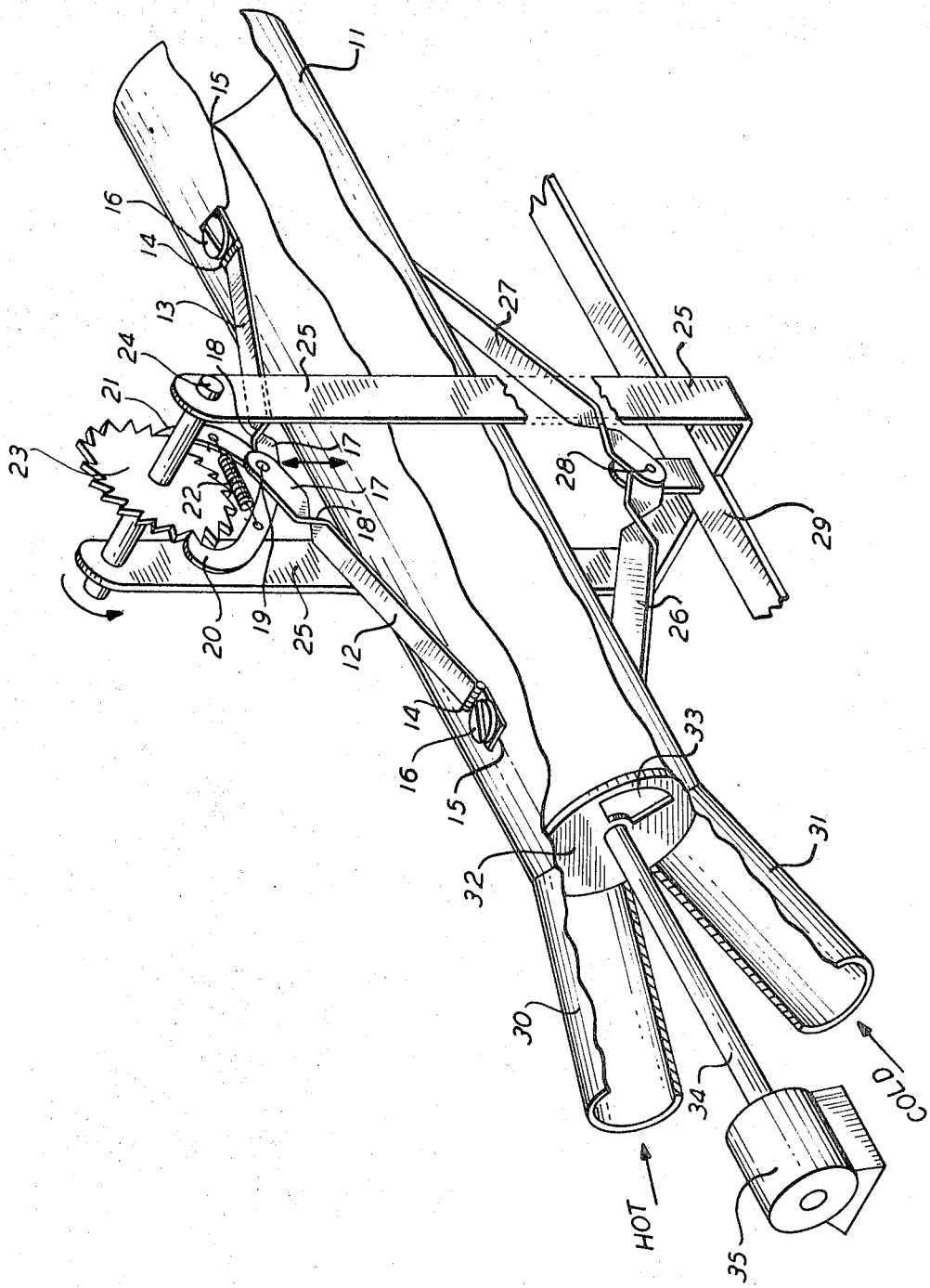

THERMAL ENGINE

BACKGROUND OF THE INVENTION

1. Field of the Invention

This invention relates generally to thermal engines, and particularly to thermal engines for utilizing the difference between the expansion and contraction of a metal under temperature changes to produce usable energy.

2. Description of Prior Art

Thermal motors are known which produce driving energy in response to hot and cold fluids alternately flowing in a conduit. Usually, the increments of forced drive have been gradual and slight. Illustrative of these devices is Euler, U.S. Pat. Nos. 2,729,756; Hays, 3,142,149; and Taylor 3,316,415.

SUMMARY OF THE INVENTION

It has been found that a device may be constructed which provides a more rapid response to alternating pulses of hot and cold fluid and which in addition, magnifies through levers, distances resulting from the expansion and contraction achieved by a conduit.

This is accomplished by levers each secured at one end to a conduit which has a high coefficient of thermal contraction and expansion; the levers are secured together at their opposite ends and are moved to magnify the distance of contraction and expansion of the base (the conduit) of the triangle.

DRAWINGS

These objects and advantages as well as other objects and advantages are attained by the device shown by way of illustration in the drawings in which the FIGURE is perspective view of the thermal engine.

REFERRED EMBODIMENT

Referring now to the drawings in detail, there is provided a conduit 11. This conduit is preferably made of copper or some similar metal which has a high coefficient of thermal expansion and contraction. A pair of levers 12, 13, are provided. At one end, each of the levers, 12, 13 is provided with a hinge 14 and a flat end 15 which end 15 is rigidly secured to the conduit 11 by screws or bolts 16 or some other suitable manner. The opposite ends 17 of the levers 13 are offset by a 90° twist 18. They are then disposed in general parallelism and are attached to each other by a pivot or pin 19. Mounted on the pivot-pin 19, there is a hooked pawl 20. Likewise pivotably mounted on the pivot-pin 19 is a straight pawl 21. The pawls 20 and 21 are normally urged toward each other by a spring 22 attached to each of them. The pawls 20 and 21 ride on a ratchet wheel 23 and rotate it. The ratchet wheel 23 is mounted on a shaft 24 which is supported for rotation on the brackets 25.

With the expansion and contraction of the conduit 11, the distance between the bolts 16 increases or decreases. This causes the pivot 19 to move a distance toward and from the conduit 11; the increase or decrease in the length of the conduit 11 is magnified by the levers 12, 13. The pawls 20, 21, are moved in accordance with the increased distance.

A corresponding pair of levers 26, 27 may be similarly attached to the conduit 11 at their outer ends, and may have their inner ends pivotably attached by a pivot pin 28 which is attached to a mounting frame 29. The levers 26, 27 will further serve to magnify the distance moved by the pivot 19.

A hot fluid duct 30 and a cold fluid duct 31 communicate together with the conduit 11. A disc 32 is mounted in the conduit 11 at the point where the ducts 30 and 31 communicate with the duct 11. The disc 32 is provided with an aperture 33, sufficiently small to open but one of the ducts at a time, and the remainder of the disc 30 is sufficiently small to obstruct the other duct. (The aperture 33 may be a sector subtending an angle of 90° or less). The disc 32 is mounted on a shaft 34 which shaft is driven by the motor 35. By the rotation of the disc 32, alternately blasts of hot and cold fluids are introduced from ducts 30, 31 alternately into the conduit 11. The conduit 11 being thermally responsive to the alternating hot and cold fluids, expands and contracts, causing the pivot 19 move with respect to the ratchet wheel 23 and to drive it.

I claim:

1. A thermal engine comprising:
   a. a conduit made of a material having a high coefficient of thermal contraction and expansion,
   b. a pair of levers,
   c. one end of each of the levers attached to the conduit in spaced relation to the end of the other,
   d. a pivot attaching the other ends of the levers together,
   e. a pair of opposed pawls mounted on the pivot,
   f. a ratchet wheel positioned between the pawls,
   g. means to urge the pawls into engagement with the ratchet wheel,
   h. the ratchet wheel mounted on a shaft,
   i. a mounting to rotatably hold the shaft.

2. A thermal engine according to claim 1 and
   a. the levers being rigid,
   b. a hinge on one end of each of the levers at the point of attachment to the conduit.

3. A thermal engine according to claim 1 and
   a. a pair of ducts connected to the conduit,
   b. disc positioned at the ends of the ducts,
   c. an aperture in the disc dimensioned sufficiently small to successively open one of the ducts to communicate with the conduit,
   means to rotate the disc,
   e. a high temperature fluid in one duct and a lower temperature fluid in the other duct, both under pressure.

4. A thermal engine according to claim 1 and
   a. the levers being generally flat strips,
   b. each of the levers having a 90° twist whereby the ends connected by the pivot are in general parallelism with each other.

5. A thermal engine according to claim 1, and
   a. a second pair of levers,
   b. one end of each of the second pair of levers attached to the conduit in spaced relation to each other,
   c. the other ends of each of the second pair of levers pivotably attached together.

* * * * *